(12) United States Patent
Krämer et al.

(10) Patent No.: US 7,634,960 B2
(45) Date of Patent: Dec. 22, 2009

(54) PNEUMATIC BRAKE BOOSTER

(75) Inventors: Horst Krämer, Ginsheim-Gustavsburg (DE); Michael Haber, Berlin (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 274 days.

(21) Appl. No.: 11/665,199

(22) PCT Filed: Oct. 7, 2005

(86) PCT No.: PCT/EP2005/055085

§ 371 (c)(1),
(2), (4) Date: Apr. 12, 2007

(87) PCT Pub. No.: WO2006/042795

PCT Pub. Date: Apr. 27, 2006

(65) Prior Publication Data

US 2007/0266849 A1 Nov. 22, 2007

(30) Foreign Application Priority Data

Oct. 15, 2004 (DE) ............ 10 2004 050 581
Oct. 4, 2005 (DE) ............ 10 2005 047 528

(51) Int. Cl.
*B60T 13/563* (2006.01)
*B60T 13/57* (2006.01)
(52) U.S. Cl. .................................... 91/369.2
(58) Field of Classification Search ........... 91/369.2, 91/369.3, 376 R
See application file for complete search history.

(56) References Cited

U.S. PATENT DOCUMENTS

| | | | | |
|---|---|---|---|---|
| 4,619,185 A | * | 10/1986 | Mori et al. ............ | 91/369.3 |
| 4,729,286 A | * | 3/1988 | Blot ............ | 91/369.2 |
| 5,245,829 A | * | 9/1993 | Osterday et al. ............ | 91/369.3 |
| 5,257,572 A | * | 11/1993 | Jakobi et al. ............ | 91/376 R |
| 5,626,069 A | | 5/1997 | Uyama | |
| 5,787,789 A | * | 8/1998 | Suzuki ............ | 91/376 R |
| 6,067,891 A | | 5/2000 | Gautier et al. | |
| 7,032,498 B2 | * | 4/2006 | Richard et al. ............ | 91/376 R |
| 2003/0066416 A1 | | 4/2003 | Dreischarf et al. | |

FOREIGN PATENT DOCUMENTS

| DE | 41 24 683 A1 | 1/1993 |
|---|---|---|
| DE | 600 04 605 T2 | 6/2004 |

OTHER PUBLICATIONS

Patent Abstract of Japan, publication No. 2002104168 A, date of publication: Apr. 10, 2002, Applicant: Honda MOtor Co. Ltd.

* cited by examiner

*Primary Examiner*—Thomas E Lazo
(74) *Attorney, Agent, or Firm*—RatnerPrestia

(57) ABSTRACT

A pneumatic brake booster for motor vehicles includes a booster housing, subdivided into at least one working chamber and at least one vacuum chamber by at least one axially movable wall to which a pneumatic differential pressure can be applied, a control valve controlling the differential pressure and arranged in a control housing to connect the working chamber to the vacuum chamber or atmosphere, the valve having two concentrically arranged sealing seats and an elastically deformable valve member, an operable input member connected to a valve piston whose movement is limited by a transverse member that can be introduced in a radial direction into the control housing, an elastic reaction element, an output member applying a boosting force to a master cylinder, and ventilating and bleeding ducts in the control housing.

11 Claims, 2 Drawing Sheets

A - A

B - B

PNEUMATIC BRAKE BOOSTER

RELATED APPLICATIONS

This application is the U.S. national phase application of PCT International Application No. PCT/EP2005/055085, filed Oct. 7, 2005, which claims priority to German Patent Application No. DE102004050581.0, filed Oct. 15, 2004 and German Patent Application No. DE102005047528.0, filed Oct. 4, 2005, the contents of such applications being incorporated by reference herein.

BACKGROUND OF THE INVENTION

The present invention relates to a pneumatic brake booster for motor vehicles comprising a booster housing, which is subdivided into at least one working chamber and at least one vacuum chamber by at least one axially movable wall to which a pneumatic differential pressure can be applied, a control valve controlling the differential pressure and being arranged in a control housing in order to connect the working chamber to the vacuum chamber or to the atmosphere, the said valve being composed of two concentrically arranged sealing seats as well as an elastically deformable valve member, an operable input member, which is connected to a valve piston whose movement in an axial direction is limited by a transverse member that can be introduced in a radial direction into the control housing, an elastic reaction element, an output member applying a boosting force to a master cylinder as well as ventilating and bleeding ducts, which are provided in the control housing and allow evacuating and ventilating the working chamber.

DESCRIPTION OF THE RELATED ART

DE 41 24 683 A1 discloses a pneumatic brake booster. The brake booster includes in each case four ventilating and bleeding ducts, with a U-shaped transverse member embracing two diametrically opposite bleeding ducts. The response and release behavior of the prior art brake booster is considered as needing improvement.

SUMMARY OF THE INVENTION

According to an exemplary embodiment of the invention, two bleeding ducts and two ventilating ducts are provided in the control housing, which extend over a total available circular cross-section of the control housing, and the ventilating ducts are interrupted in each case by two webs in order to accommodate the transverse member. A like arrangement of respectively two ventilating and bleeding ducts allows realizing a largest possible flow cross-section of the ducts and, thus, quick ventilation and bleeding of the working chamber. This improves the response and release characteristics of the brake booster, which depends on the rapidity of ventilating and bleeding of the working chamber. The ventilating ducts are interrupted only by a smallest possible cross-section of the webs.

Further improvement of the response dynamics is achieved in that the ventilating ducts extend in an axial direction roughly over the length of the bleeding ducts. The flow cross-section of the ventilating ducts is considerably increased thereby. In addition, the air flow is improved because the axial distance between the ventilating ducts and the flow-critical area of the sealing seats of the control valve is shortened in an optimal manner.

In an exemplary embodiment, the ventilating and bleeding ducts are respectively arranged diametrically opposite each other and distributed symmetrically on a periphery of the control housing.

A favorable improvement of the invention is achieved in that the bleeding ducts extend in each case at an angle of roughly 80° and the ventilating ducts extend in each case at an angle of roughly 100° of the available circular cross-section of the control housing. This distribution has proved to be an optimal relationship between response and release dynamics.

In an exemplary embodiment, the webs are arranged within the one ventilating duct diametrically opposite the webs of the second ventilating duct distributed symmetrically on the periphery of the control housing.

In order to improve the ease of assembly of the brake booster, the reaction element and a head flange of the output member are arranged in a sleeve, which has a basically cylindrical configuration and is arranged on the control housing so that the reaction element in an axial direction adjoins the head flange, on the one hand, and the control housing and the valve piston, on the other hand, while it abuts the sleeve in a radial direction. It is furthermore favorable that this fact allows minimizing the slot extrusion of the reaction element in the transition area between sleeve and control housing, which causes damage to the reaction element.

According to an exemplary embodiment of the invention, the sleeve at its ends includes a means to facilitate the assembly. The means can for example be designed as a chamfer or a collar oriented in a radially outwards direction.

The sleeve may be favorably fixed in an axial direction by means of a holding element, provided so as to be preloaded by a restoring spring of the brake booster, with the holding element being additionally used to guide the output member. This obviates the need for an additional holding element.

All previously described exemplary embodiments and improvements of the invention may also be provided for use in a brake booster of tandem-type construction, wherein the interior of the brake booster is subdivided by means of a partition into a first and a second booster chamber, with the partition including a centrically arranged circular recess, which is penetrated by the control housing and the partition being in sealing abutment on the control housing by means of a sealing element, with a first and a second movable wall subdividing the first booster chamber into a first vacuum chamber and a first working chamber and the second booster chamber into a second vacuum chamber and a second working chamber, as well as with one or a plurality of connecting channels between the first working chamber and the second working chamber for the purpose of pressure balance between these two chambers. It is advantageous for an economical manufacture of the control housing that the connecting channels and the ventilating ducts of the control housing are arranged in relation to each other offset by an angle of roughly 90° with respect to the center line thereof. This renders possible manufacturing the control housing with up to four cavities in the injection molding die.

BRIEF DESCRIPTION OF THE DRAWINGS

Further features and advantages of the invention can be taken from the subsequent description and accompanying drawings, of which:

FIG. 1 shows a longitudinal cross-sectional view of an embodiment of a tandem-type pneumatic brake booster 1 of the invention, comprising a booster housing 2 including a first housing shell 3 and a second housing shell (not shown) being preferably press fitted to each other by means of non-cutting shaping provisions. The interior of the booster housing 2 is subdivided by means of a roughly centrically arranged, stationary partition 5 into a first, front booster chamber 6 close to the master cylinder and a second, rear booster chamber 7 close to the brake pedal. The partition 5 includes a centrically arranged circular recess 8, which is penetrated by a control housing 9 or rather its cylindrical extension 10. The partition 5 is in sealing abutment on the extension 10 by means of a sealing element 11.

Figure 1:
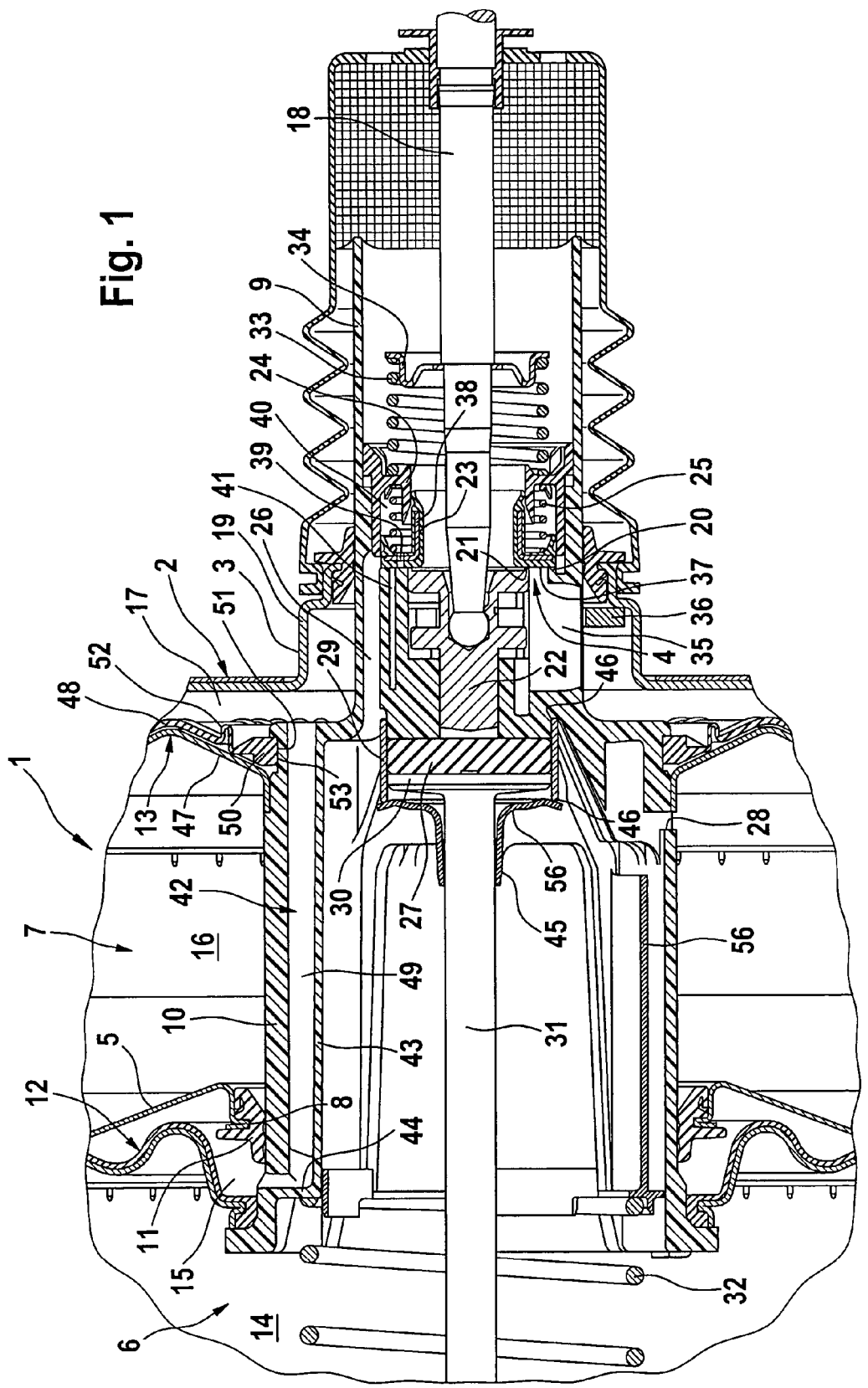
FIG. 1 shows a partial longitudinal cross-sectional view of an embodiment of a brake booster of the invention.

The first, front booster chamber 6 is subdivided by a first movable wall 12 into a first vacuum chamber 14 of constant pressure and into a first working chamber 15 of variable pressure, while the second, rear booster chamber 7 is subdivided by a second movable wall 13 into a second vacuum chamber 16 and a second working chamber 17. Usually, the second housing shell (not shown) is provided with a vacuum connection, by means of which the first vacuum chamber 14 can be connected to an appropriate vacuum source, e.g. a suction manifold of the motor vehicle engine, or to a vacuum pump.

The first housing shell 3 is provided with an axial portion 19 of small diameter in which the control housing 9 is axially movably guided in a sealed manner. Housed in the interior of the control housing 9 is a control valve 4, allowing a controlled ventilation of the two working chambers 15, 17, and thereby controlling the difference in pressure between the vacuum chambers 14, 16 and the working chambers 15, 17.

The control valve 4 is operable by an input member 18, which is connected to a brake pedal (not shown) and comprises a first sealing seat 20 designed on the control housing 9, a second sealing seat 21 that is designed on a valve piston 22 connected to the input member 18, and a valve member 23, which cooperates with both sealing seats 20, 21 and is urged against the valve seats 20, 21 by means of a valve spring 25 being supported on a guide element 24. The second working chamber 17 can be connected to the first vacuum chamber 14 by way of two bleeding ducts 26 that extend laterally in the control housing 9.

By way of a rubber-elastic reaction element 27 that abuts frontally on the control housing 9 and an output member 31 having a head flange 30, brake force is transmitted to an actuating piston of a master cylinder (not shown) of the motor vehicle brake system, which is mounted at the vacuum-side end of the brake booster 1. The input force introduced at the input member 18 is transmitted to the reaction element 27 by means of the valve piston 22.

A restoring spring 32, which is supported on the vacuum-side end wall of the booster housing 2, maintains the movable walls 12, 13 in the initial position shown. In addition, a return spring 33 is provided, which is arranged between a holding element 34 arranged at the input member 18 and the guide element 24 of the control valve 4, and the force of which produces a bias of the valve piston 22 or its valve seat 21 relative to the valve member 23.

In order to connect the second working chamber 17 to the atmosphere when the control valve 20 is operated, two ventilating ducts 35 are provided in the control housing 9.

The return movement of the valve piston 22 at the end of a brake operation is delimited by a transverse member 36, which can be introduced in a radial direction into the control housing 9 and bears against the booster housing 2 in the release position of the brake booster as shown in the drawing.

The valve member 23 includes an annular sealing surface 37, which cooperates with the two sealing seats 20, 21, which is reinforced by a metallic, L-shaped reinforcing element 38 and includes several axial passages 39.

A pneumatic chamber 40 is delimited in the control housing 9. The flow ducts (not referred to in detail) being provided by the passages 39 connect the pneumatic chamber 40 to an annular chamber 41 that is delimited by the sealing seats 20, 21 and into which the above-mentioned ventilating ducts 35 open so that the pneumatic chamber 40, which is arranged on the side of the valve member 23 remote from the sealing surface 37, is in constant communication with the second working chamber 17, and pressure balance takes place at the valve member 23.

The connection between the first and the second vacuum chambers 14, 16 is constituted by one or more apertures 28 in the extension 10 of the control housing 9, which are provided in the area between the partition 5 and the second movable wall 13.

Further, one or more substantially axially aligned connecting channels 42 are provided in the extension 10 of the control housing 9, interconnecting the first and the second vacuum chambers 14, 16. Preferably two connecting channels 42 are provided, which extend in an axial direction from the second working chamber 17 to the first working chamber 15 and open radially into the first working chamber 15. As this occurs, a connecting channel 42 is formed in each case by axial side walls 43, 49 and a radial side wall 44. As FIG. 1 shows the brake booster 1 in a longitudinal cross-section through two planes, the second connecting channel 42 is not visible, however, the symmetrical design of the brake booster 1 becomes obvious from the Figures being subsequently described.

The reaction element 27 and the head flange 30 of the output member 31 are arranged in a cylindrical sleeve 29 positioned at the control housing 9 and serving to avoid damages to the control housing 9, which can be due to transverse forces that act on the output member. As is apparent from FIG. 1, the reaction element 27 in an axial direction adjoins the head flange 30, on the one hand, and the control housing 9 and the valve piston 22, on the other hand. The reaction element 27 is adjacent to the sleeve 29 in a radial direction. Due to the cylindrical shape of the sleeve 29, the slot extrusion of the reaction element 27 in the transition area between sleeve 29 and control housing 9 is minimized, which can cause damage to the reaction element 27. Besides, the sleeve 29 is simple to manufacture and, hence, inexpensive.

The sleeve 29 is fixed in an axial direction on the control housing 9 by means of a holding element 56, which in turn is preloaded by the restoring spring 32 of the brake booster 1. It is apparent from FIG. 1 that the holding element 56 includes an inward, axial, cylindrical extension 45 being used to guide the output member 31 in a radial direction.

To facilitate the assembly, the sleeve 29 has chamfers 46 at its ends. Alternatively, radially outwards designed collars can also be provided at the ends of the sleeve 29.

The second movable wall 13 is constituted by a diaphragm plate 47 and a rolling diaphragm 48 abutting thereon, the radially inward sealing bead 40 of the diaphragm being compressed in an annular groove 51 provided in the extension 10 of the control housing 9, with the aid of a radially inwards directed preload.

It can be seen that the rolling diaphragm 48 has a predetermined folding point, at which the rolling diaphragm 48 is folded after the assembly on the control housing 9. The so produced fold 52 allows a high rate of preload of the sealing bead 50 and additionally safeguards the abutment of the rolling diaphragm 48 on the diaphragm plate 47. The great radial preload of the rolling diaphragm 48 allows a small radial mounting space of the interface control housing—diaphragm plate—rolling diaphragm, in particular a small radial depth of the annular groove 51, into which the sealing bead 50 is fitted.

Further, the sealing bead 50 has a circumferential sealing surface 53 on a bottom side.

To ensure safe compression of the rolling diaphragm 48, the radially inward sealing bead 50 is configured in such a fashion that it can tilt in the direction of the second working chamber 17, with the sealing surface 53 being lifted from a bottom of the annular groove 51 in order to permit a quick pressure reduction from the second vacuum chamber 16 in the direction of the working chamber 17 via the sealing bead 50. Due to the tilting function of the sealing bead 50, detachment of the rolling diaphragm 48 can be prevented and pressure can discharge in the direction of the working chamber 17 even in the event of a pressure impact from the side of the second vacuum chamber 16, which can develop e.g. when the brake booster 1 is operated without vacuum, with the wheel circuits open, or when a vacuum hose is suddenly pulled off the first vacuum chamber 14 of the brake booster 1.

Figure 2:
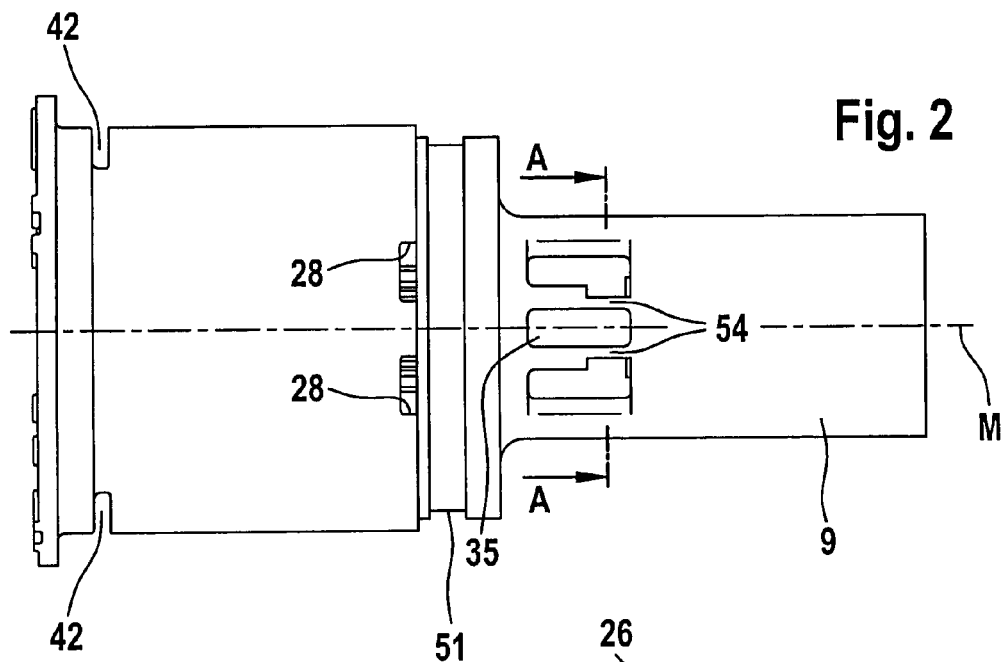
FIG. 2 is a side view of a control housing of the brake booster of the invention according to FIG. 1.
Figure 3:
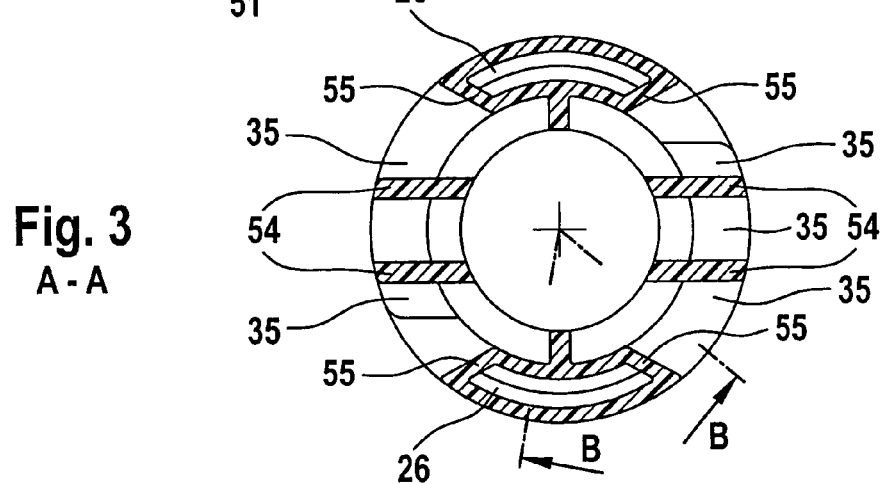
FIG. 3 is a cross-section of the control housing of FIG. 2 taken along line A-A.
Figure 4:
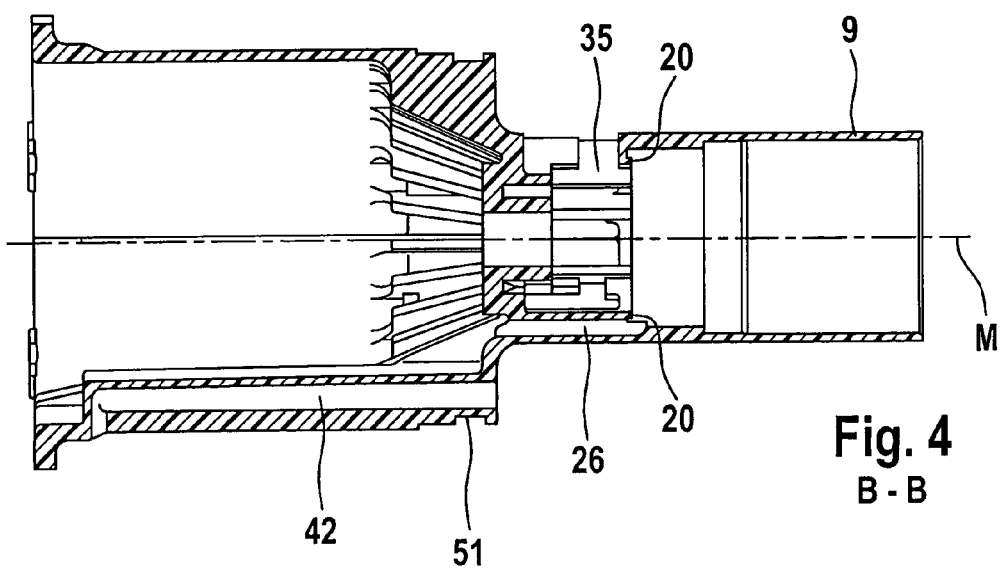
FIG. 4 is a longitudinal cross-section of the control housing of FIG. 2 taken along line B-B.

FIGS. 2 to 4 show different views and cross-sections of the control housing 9 of the brake booster 1 described according to FIG. 1. FIG. 2 shows a side view, FIG. 3 depicts a cross-section taken along the line A-A shown in FIG. 2, and FIG. 4 depicts a cross-section taken along the line B-B shown in FIG. 3.

It becomes apparent from FIGS. 2 and 3 that the ventilating ducts 35 are interrupted by two webs 54, which are used to accommodate, guide and fix the transverse member 36. The webs 54 inside the one ventilating duct 35 are arranged diametrically opposite the webs 54 inside the second ventilating channel 36 distributed symmetrically on a periphery of the control housing 9.

As can be seen in FIG. 3 in particular, the ventilating and bleeding ducts 26, 35 are arranged diametrically opposite in each case distributed symmetrically on the periphery of the control housing 9. The two bleeding ducts 26 extend in each case at an angle of roughly 80° and the two ventilating ducts 35 extend in each case at an angle of roughly 100° of the available circular cross-section of the control housing 9. This distribution has proved to be an optimal relationship between response and release dynamics. It can also be seen that the ventilating ducts 35 are interrupted only by a cross-section of the webs 54 that is smallest possible in terms of stability. Thus, a largest possible flow cross-section of the ducts 26, 35 is realized, what allows quick ventilation and bleeding of the working chamber. This fact improves the response and release characteristics of the brake booster 1, which depends on the rapidity of ventilating and bleeding of the working chambers 15, 17.

The ventilating ducts 35 include a radially extending exit area, which is bounded by outside walls 55 of the bleeding ducts 26.

It is visible from FIG. 4 that the ventilating ducts 35 extend in an axial direction roughly over the length of the bleeding ducts 26, with the flow cross-section of the ventilating ducts 35 being considerably increased thereby. In addition, the air flow is improved because the axial distance between the ventilating ducts 35 and the flow-critical area of the sealing seats 20, 21 of the control valve 4 is optimally shortened.

As can be seen in FIG. 2, the connecting channels 42 and the ventilating ducts 35 are arranged offset in relation to each another by an angle of roughly 90° relative to the center line M thereof. This renders possible a very economical manufacture of the control housing 9 with up to four cavities in the injection molding die.

The brake booster 1 of the invention is shown in tandem-type design. However, the invention is principally suitable for use in all pneumatic brake boosters in tandem-type and single-type design.

The invention claimed is:

1. A pneumatic brake booster for motor vehicles comprising:
a booster housing, subdivided into at least one working chamber and at least one vacuum chamber by at least one axially movable wall to which a pneumatic differential pressure can be applied,
a control valve controlling the differential pressure and being arranged in a control housing in order to connect the working chamber to the vacuum chamber or to the atmosphere, said valve being composed of two concentrically arranged sealing seats as well as an elastically deformable valve member,
an operable input member, connected to a valve piston whose movement in an axial direction is limited by a transverse member that can be introduced in a radial direction into the control housing,
an elastic reaction element,
an output member applying a boosting force to a master cylinder, and
ventilating and bleeding ducts, which are provided in the control housing and allow evacuating or ventilating the working chamber,
wherein two bleeding ducts and two ventilating ducts are provided in the control housing, which extend over a total available circular cross-section of the control housing, and the ventilating ducts are interrupted in each case by two webs in order to accommodate the transverse member.

2. The pneumatic brake booster as claimed in claim 1, wherein the ventilating ducts extend in an axial direction roughly over the length of the bleeding ducts.

3. The pneumatic brake booster as claimed in claim 2, wherein the ventilating and bleeding ducts are respectively arranged diametrically opposite each other distributed symmetrically on a periphery of the control housing.

4. The pneumatic brake booster as claimed in claim 3, wherein the bleeding ducts extend in each case at an angle of roughly 80° and the ventilating ducts extend in each case at an angle of roughly 100° of the available circular cross-section of the control housing.

5. The pneumatic brake booster as claimed in claim 3, wherein the webs are arranged inside the one ventilating duct diametrically opposite the webs inside the second ventilating duct distributed symmetrically on the periphery of the control housing.

6. The pneumatic brake booster as claimed in claim 5, wherein the reaction element and a head flange of the output member are arranged in a sleeve, which has a basically cylindrical configuration and is arranged on the control housing so that the reaction element in an axial direction adjoins the head flange, on the one hand, and the control housing and the valve piston, on the other hand, while it abuts the sleeve in a radial direction.

7. The pneumatic brake booster as claimed in claim 6, wherein the cylindrical sleeve at its ends includes a means to improve the assembly.

8. The pneumatic brake booster as claimed in claim 7, wherein the sleeve is designed in a chamfered way at its ends.

9. The pneumatic brake booster as claimed in claim 7, wherein the sleeve at its ends includes a collar oriented in a radially outward direction.

10. The pneumatic brake booster as claimed in claim 8, wherein the sleeve is fixed in an axial direction by means of a holding element, which is provided so as to be preloaded by a restoring spring of the brake booster, with the holding element being additionally used to guide the output member.

11. The pneumatic brake booster as claimed in claim 1, wherein the brake booster is designed in tandem-type construction, and the interior of the brake booster is subdivided by means of a partition into a first and a second booster chamber, with the partition including a centrically arranged circular recess, which is penetrated by the control housing and the partition being in sealing abutment on the control housing by means of a sealing element, with a first and a second movable wall subdividing the first booster chamber into a first vacuum chamber and a first working chamber and the second booster chamber into a second vacuum chamber and a second working chamber, as well as with one or a plurality of connecting channels between the first working chamber and the second working chamber for the purpose of pressure balance between these two chambers, wherein the connecting channels and the ventilating ducts of the control housing are arranged in relation to each other offset by an angle of roughly 90° with respect to the center line (M) thereof.

* * * * *